(12) United States Patent
Foster

(10) Patent No.: US 10,404,494 B2
(45) Date of Patent: Sep. 3, 2019

(54) COMMUNICATIONS NETWORKS

(71) Applicant: British Telecommunications Public Limited Company, London (GB)

(72) Inventor: Kevin Foster, London (GB)

(73) Assignee: British Telecommunications Public Limited Company, London (GB)

(*) Notice: Subject to any disclaimer, the term of this patent is extended or adjusted under 35 U.S.C. 154(b) by 185 days.

(21) Appl. No.: 15/300,986

(22) PCT Filed: Mar. 27, 2015

(86) PCT No.: PCT/GB2015/050944
§ 371 (c)(1),
(2) Date: Sep. 30, 2016

(87) PCT Pub. No.: WO2015/150755
PCT Pub. Date: Oct. 8, 2015

(65) Prior Publication Data
US 2017/0026200 A1    Jan. 26, 2017

(30) Foreign Application Priority Data
Mar. 31, 2014  (EP) ................................ 14250064

(51) Int. Cl.
*H04L 25/02* (2006.01)
*H04M 3/22* (2006.01)
*H04M 11/06* (2006.01)
*H04B 10/80* (2013.01)

(52) U.S. Cl.
CPC ....... *H04L 25/0276* (2013.01); *H04B 10/801* (2013.01); *H04M 3/229* (2013.01); *H04M 11/062* (2013.01)

(58) Field of Classification Search
CPC ............ H04L 27/0002; H04L 27/2626; H04L 27/2647; H04L 5/023
See application file for complete search history.

(56) References Cited

U.S. PATENT DOCUMENTS

2010/0283534 A1* 11/2010 Pierdomenico ....... H03F 3/4508
                                                            327/536
2017/0026200 A1*  1/2017 Foster ................. H04L 25/0276

FOREIGN PATENT DOCUMENTS

EP          2 509 250 A1   10/2012
GB          2503636 A       1/2014
WO      WO 2010/111456 A1   9/2010

OTHER PUBLICATIONS

International Search Report for corresponding International Application No. PCT/GB2015/050944 dated Jun. 9, 2015; 4 pages.
Written Opinion for corresponding International Application No. PCT/GB2015/050944 dated Jun. 9, 2015; 6 pages.

* cited by examiner

*Primary Examiner* — Nafiz E Hoque
(74) *Attorney, Agent, or Firm* — Patterson Thuente Pedersen, PA

(57) ABSTRACT

A method of configuring a network element, for example an amplifier in a VDSL network. Configuration is transmitted to the amplifier using a common mode voltage signal so that there is no interference with the telephony or DSL signals.

12 Claims, 5 Drawing Sheets

COMMUNICATIONS NETWORKS

CROSS-REFERENCE TO RELATED APPLICATIONS

The present application is a National Phase entry of PCT Application No. PCT/GB2015/050944, filed on 27 Mar. 2015, which claims priority to EP Patent Application No. 14250064.4, filed on 31 Mar. 2014, which are hereby fully incorporated herein by reference.

TECHNICAL FIELD

The present disclosure relates to a communications network and in particular to a communications network using digital subscriber line (DSL) technology.

BACKGROUND

Asymmetric digital subscriber line (ADSL) systems enable data to be transmitted over a pair of metallic twisted pair (usually copper) wires to customer premises. It is thought that the maximum transmission performance that is likely to be obtained with modern variants of ADSL is a download data rate of 24 Mbps and an upload speed of about 3 Mbps. Such data rates are dependent on the length, insulation dielectric and gauge of the metallic twisted pair from the customer premises to the telephone exchange and thus many customers will receive services at significantly lower data rates.

To improve data rates optical fiber has been installed into the access network. The greatest data rates are likely to be provided using fiber to the premises (FTTP) networks, such as passive optical networks (PONs), but there is a significant cost involved in providing fiber all the way to customer premises. Fiber to the cabinet (FTTCab) networks are known to provide an attractive solution to providing customers with high data rate services without requiring as much investment as FTTP networks. Typically in FTTCab networks, very high bit-rate digital subscriber line (VDSL) systems are used to provide data rates of 40 Mbps and higher, for both upload and download on the metallic twisted pair cables. It is believed that improvements to VDSL systems, particularly vectoring may provide data rates in excess of 100 Mbps in the future.

DSL systems work by utilizing the frequencies above those which are used by the conventional telephony signals. In particular, VDSL2 defines multiple frequency windows for downstream and upstream data, according to which internationally standardized band plan is set. Each of these windows comprises a number of data transmission carriers which normally have a 4.3125 kHz frequency separation. Each of these carriers will transmit one or more symbols with each of these symbols being used to transmit up to 15 bits of data. During a training process the insertion loss and noise level are determined for each of the carriers such that the signal to noise ratio (SNR) for each carrier can be determined. The training process determines the capacity of the upstream and downstream links in accordance with the SNRs of each of the carriers.

FIG. 1 shows a schematic depiction of a FTTCab network in which a telephone exchange 100 is connected to a plurality of cabinets 120 by optical fiber cables 110. These cabinets 120 comprise the opto-electronic equipment necessary to send data to the customer premises 200 over a twisted metallic (usually copper) cable 130. Typically, a customer will use the communications network to access the internet and to access data such as video on demand services. Alternatively, the network may be used to transmit television channels which might conventionally be transmitted using a terrestrial or satellite transmission channel. One of the limitations of DSL systems is that the data signals are attenuated as they are transmitted across the metallic twisted pair cables. The maximum design range of the VDSL technology from the cabinet to the customer premises is typically 1.5-2 km, but often some outlying customer premises are located at distances much greater than the maximum design range. Beyond this maximum range then it is not usually possible to deliver a reliable data service of greater than 2 Mbps (this has been set by Ofcom as being the minimum data rate for all UK customers by the end of 2015). However, there are a significant number of customers whose properties are significantly further from the cabinet than this maximum range. A solution to this problem would be to deploy fiber further into the periphery of the access network but this is an expensive solution for a small number of customer premises.

Another solution is to use a VDSL amplifier to boost the signals in one or more of the frequency bands assigned to downloading (and to also uploading). Such amplifiers can increase the maximum range of a VDSL system to typically 3-4 km. An example of such an amplifier is the VBA (VDSL Broadband Amplifier) provided by Actelis Networks. FIG. 2 shows a schematic depiction of the network described above with reference to FIG. 1 in which a VDSL amplifier 150 has been placed in line with each of the metallic twisted pair cables that form the D-side or Distribution Side access network 130.

When a VDSL cabinet 120 is installed, it is necessary to determine a parameter referred to as the CAL, or Cabinet Assigned Loss. This parameter describes the electrical length of the cables between the exchange and the cabinet (this portion of the access network is referred to as the Exchange-side (or E-side) network). The CAL value will be entered into the DSLAM housed in the cabinet and this value will be used for determining the power spectral density (PSD) of the VDSL signals used when transmitting data to the customer premises. Furthermore, it is necessary that the CAL parameter value be entered into a VDSL amplifier to ensure its proper operation within the limits of any defined spectrum management rules such as the UK ANFP (NICC ND:1602). In the UK ANFP, the CAL parameter is a whole number value in the range 0-52 dB, and each VDSL2 cabinet or DSLAM has such a value set which is a function of the E-side length and cable routing from the serving exchange to the cabinet.

SUMMARY

According to a first aspect of the present disclosure there is provided a method of operating a communications network, the method comprising: a) inserting a common mode voltage signal onto an electrical conductor at a first location, the common mode voltage signal carrying data comprising one or more operational parameters which determine the gain of an amplifier; b) receiving the common mode voltage signal from the electrical conductor at a second location; and c) operating an amplifier located at the second location in accordance with the one or more operational parameters.

The data carried using the common mode voltage signal may further comprise data identifying one or more network elements; these network elements may be a cabinet or a cable in a FTTCab network. The common mode voltage signal may be transmitted at a frequency in excess of 10 kHz., or preferably at a frequency in excess of 30 kHz.

The common mode voltage signal may be transmitted until it can be determined that the amplifier is being operated in accordance with the one or more operational parameters. The operation of the amplifier may be determined in accordance with the data signals that are received at a customer premises which is connected to the communications network.

The application of the data for the one or more operational parameters to the network element may configure the operation of the network element. The data for the one or more operational parameters may determine the gain of an amplifier. The common mode voltage signal may further comprise data identifying one or more network elements. The common mode voltage signal may further comprise data identifying a cabinet in a FTTCab network or a cable.

According to a second aspect of the present disclosure there is provided a communications network, the network comprising a fiber optic cable connection to a cabinet, a metallic cable connecting the cabinet to a customer premises and an amplifier connected to the metallic cable at a location intermediate the cabinet and the customer premises; the network being configured, in use, to: couple a common mode voltage signal onto the metallic cable at the cabinet, the common mode voltage signal carrying data comprising one or more operational parameters which determine the gain of an amplifier; receive the common mode voltage signal from the metallic cable at the amplifier; and operate the amplifier in accordance with the one or more operational parameters.

According to a third aspect of the present disclosure there is provided an amplifier for use in a communications network, wherein the amplifier is connected to a cabinet via a metallic cable and, in use, is configured to: receive a common mode voltage signal from the metallic cable, the common mode voltage signal having been applied to the metallic cable at the cabinet and which comprises one or more operational parameters which determine the gain of an amplifier; and operate the amplifier in accordance with the received one or more operational parameters.

BRIEF DESCRIPTION OF THE DRAWINGS

Embodiments of the present disclosure will now be described, by way of example only, with reference to the accompanying drawings in which.

DETAILED DESCRIPTION

Figure 1:
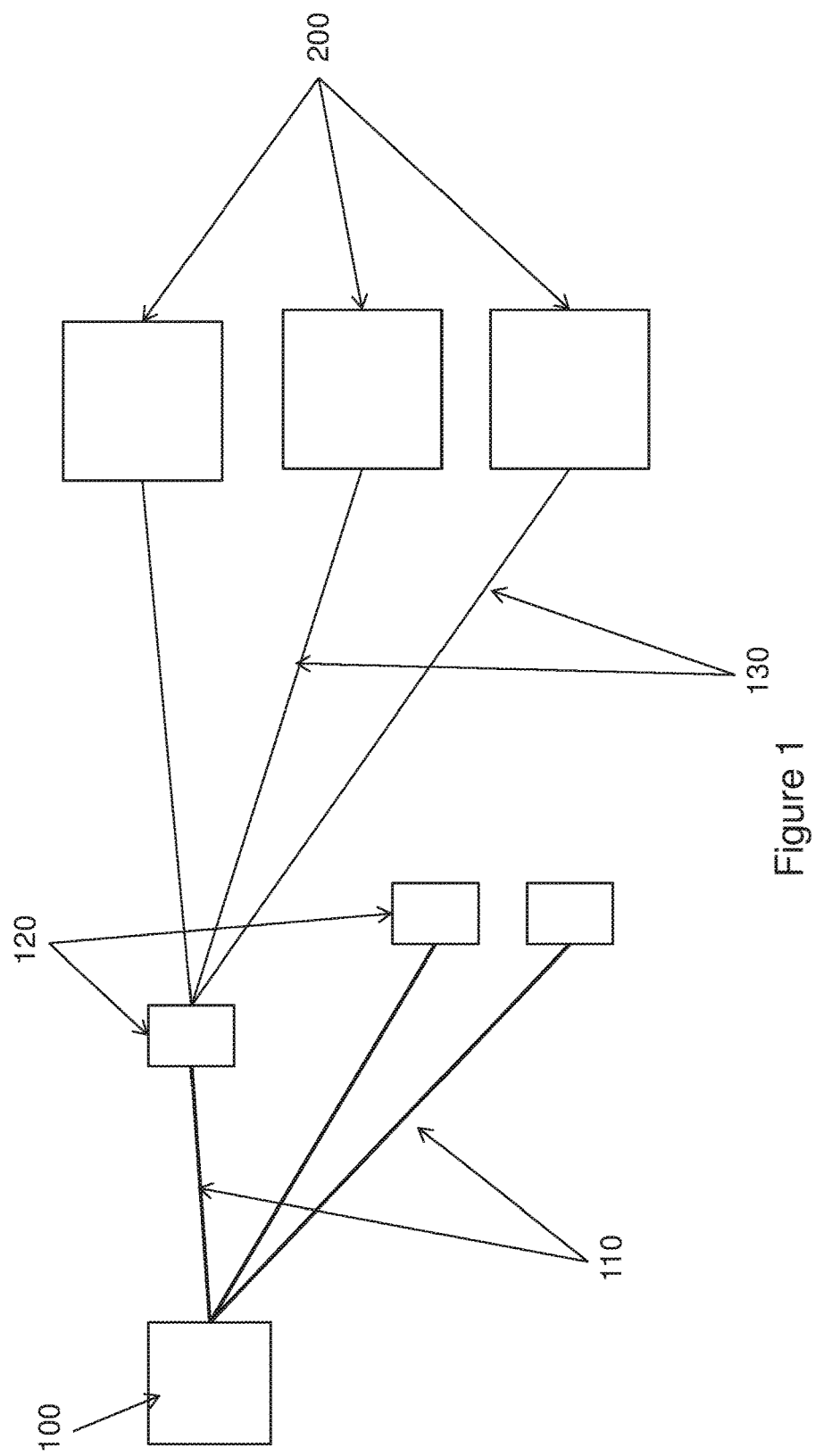
FIG. 1 shows a schematic depiction of a FTTCab network in which a telephone exchange is connected to a plurality of cabinets by optical fiber cables.
Figure 2:
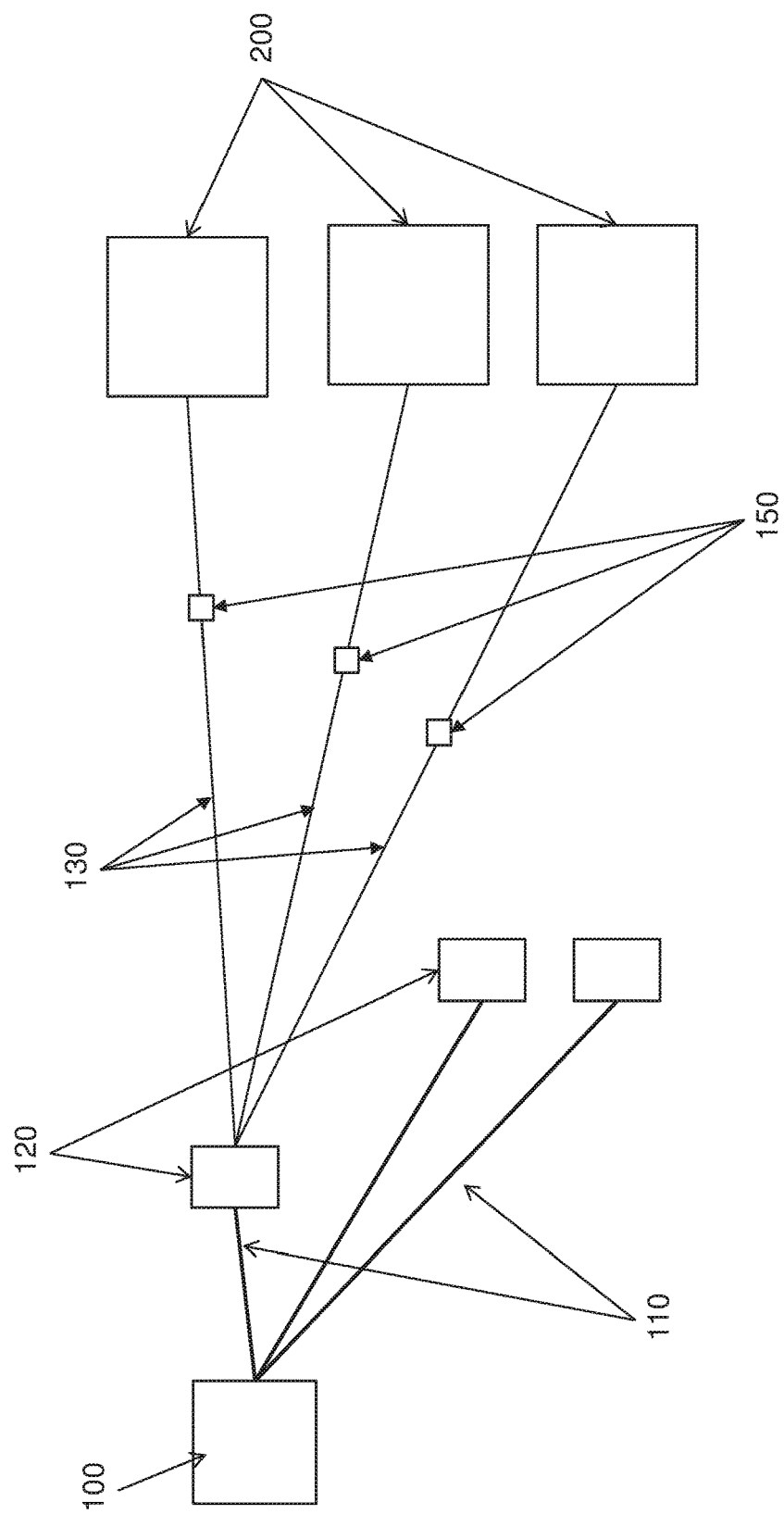
FIG. 2 shows a schematic depiction of a FTTCab network further comprising VDSL amplifiers connected in line with the copper cables.
Figure 3:
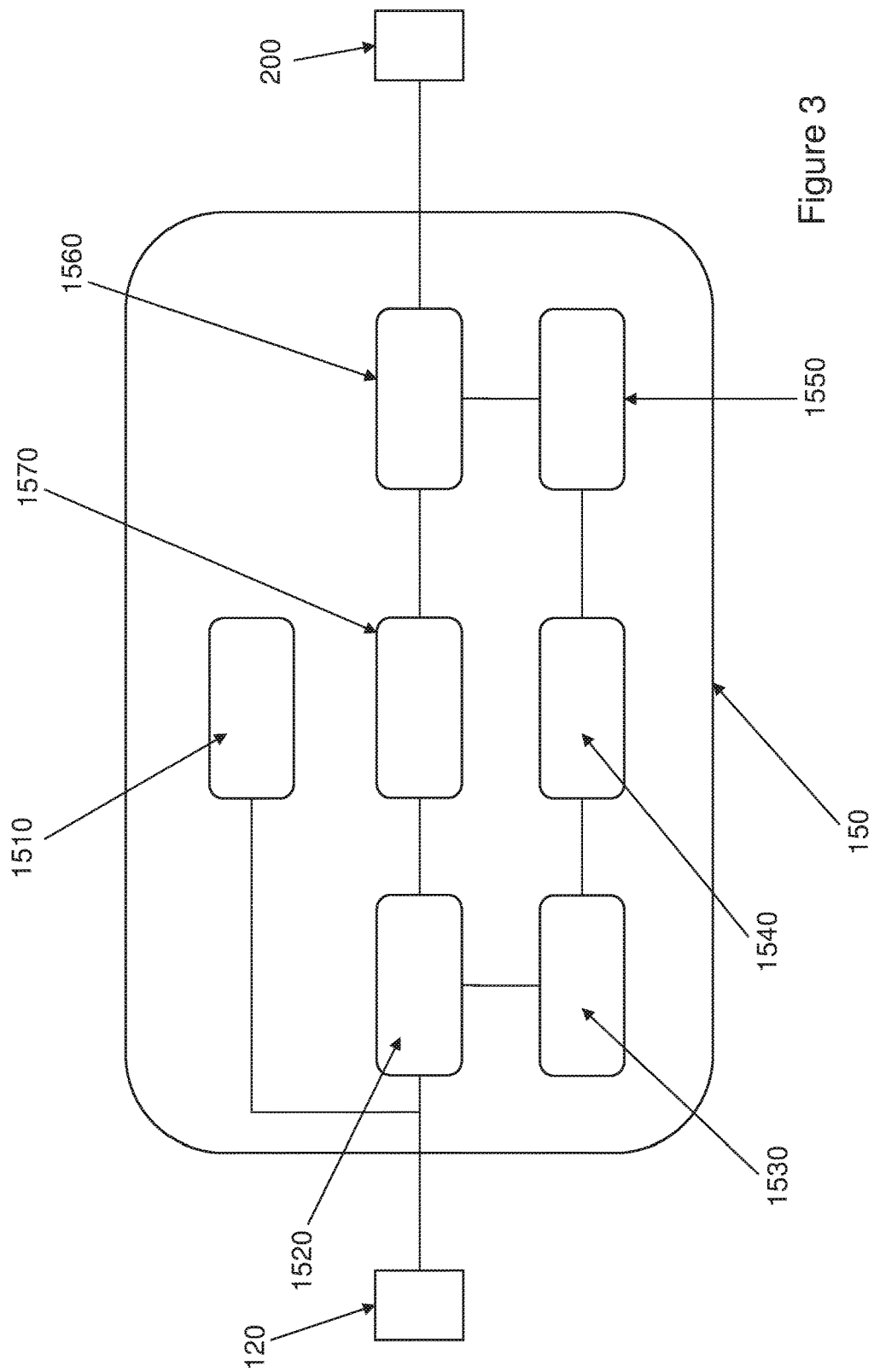
FIG. 3 shows a schematic depiction of a VDSL amplifier.

FIG. 3 shows a schematic depiction of a VDSL amplifier 150 which comprises power convertor 1510, first 2/4 line hybrid 1520, first band pass filter 1530, downstream amplifier 1540, second band pass filter 1550, second 2/4 line hybrid 1560 and third band pass filter 1570. The first and second 2/4 line hybrids act to allow the telephony signals to pass through unaltered. The first band pass filter 1530 separates one or more of the downstream frequency bands such that the frequency band(s) can be amplified by the downstream amplifier 1540. The second band pass filter 1550 act so as to ensure that the amplification does not introduce any noise or interference outside of the specified downstream frequency bands. For example, plan 998ADE17 specifies three downstream frequency bands: 0.138-3.75 MHz, 5.2-8.5 MHz and 12-17.664 MHz. The amplified signal is then reintroduced onto the metallic twisted pair cable so that it can be transmitted to the customer premises 200.

Figure 4:
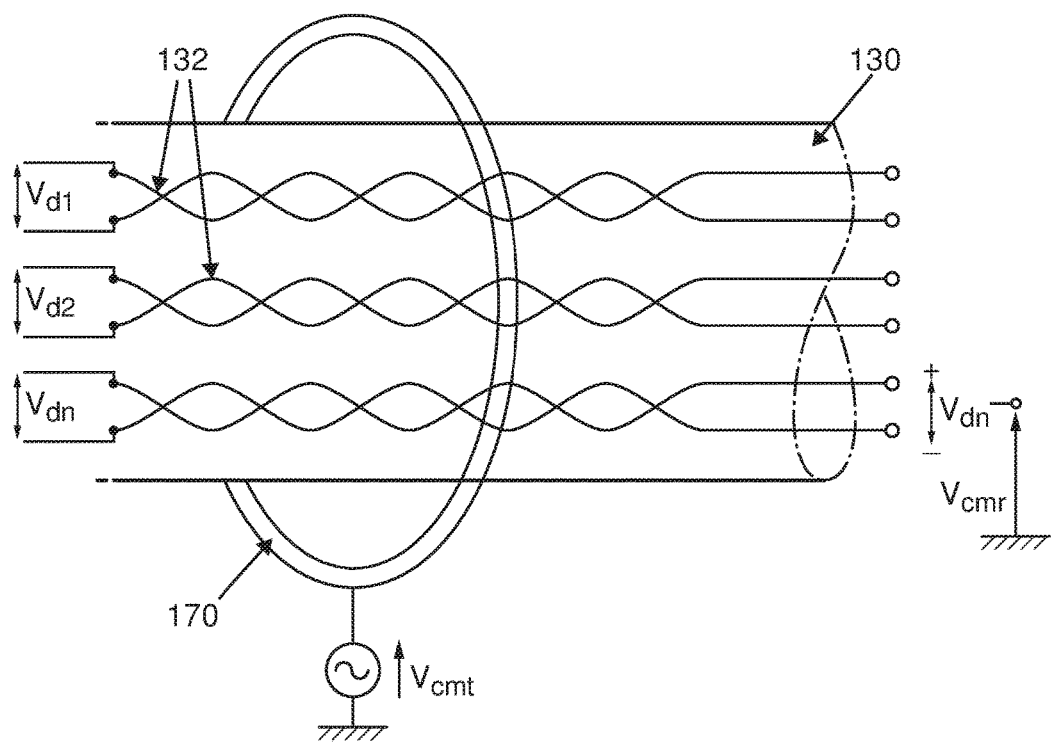
FIG. 4 shows a schematic depiction of an apparatus according to the present disclosure.

FIG. 4 shows a schematic depiction of an apparatus according to the present disclosure. The copper cables 130 will comprise multiple pairs of twisted copper wires 132, typically from 10-100 pairs, with one pair being reserved for each customer. As can be seen from FIG. 4, a respective signal is transmitted over each of the pairs using a differential signal. Furthermore, an apparatus 170, such as a current clamp, can be connected around all of the pairs in the cable at the cabinet and a common mode voltage signal can be transmitted over all of the copper pairs. This common mode signal can be modulated to identify the cabinet and the CAL parameter value associated with that cabinet.

Figure 5:
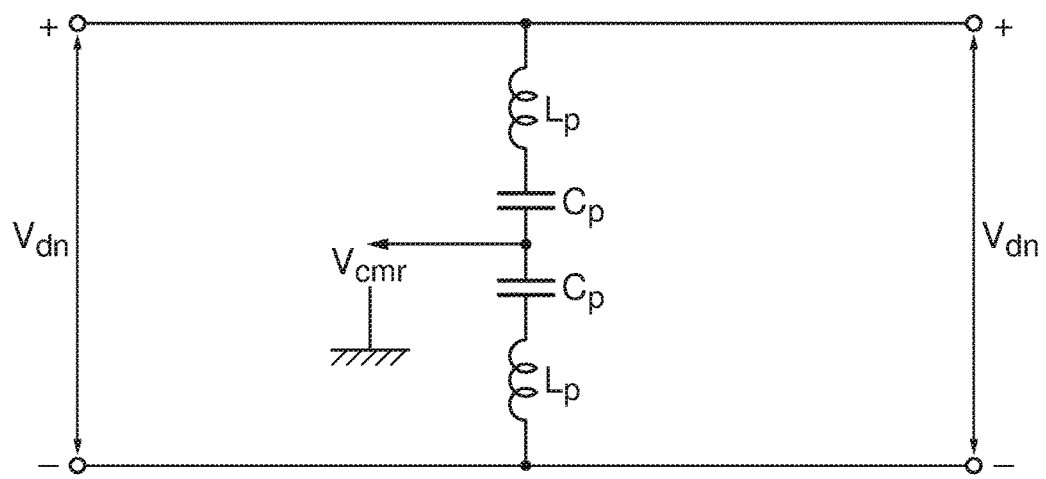
FIG. 5 shows a schematic depiction of an example pick up circuit for use in a VDSL amplifier.

The VDSL amplifier can be adapted to detect this injected common mode voltage signal from the copper pair to which it is connected. FIG. 5 shows a schematic depiction of an example pick up circuit in which the value $C_p$ of the capacitors is chosen such that any DC signals present on the copper pair are blocked and the value $L_p$ of the inductors are selected such that the circuit is not loaded in the chosen frequency band. Once received, the CAL value can be decoded from the common mode voltage signal and can be used in the operation of the VDSL amplifier. If transmitted, an identifier for the cabinet may also be stored by the VDSL amplifier and used to configure the amplifier.

It will be understood that further information may be transmitted in addition to the CAL value. For example, each cabinet could be assigned a unique identifier, which could be transmitted along with the CAL value. If network engineers were to be provided with a tool which could receive the common mode signal then this information could be used when performing repair and maintenance tasks. Such a tool could be of use in circumstances where a single distribution point is fed by cables which are connected to different cabinets. Furthermore, or alternatively, as the common mode injecting apparatus 170 is coupled to a single cable then it would be possible to transmit a unique cable identifier along with the cabinet identifier and/or the CAL value.

It should be understood that the amount of data to be transmitted using the common mode signal is very small. Under normal circumstances putting too much power into the common mode is avoided so it will be necessary to send the common mode signal at a very low power level. Given this requirement it is advantageous if the common mode signal is transmitted at a frequency that will propagate well to enable the detection of the signal. Advantageously the signal would be transmitted at a frequency of at least 10 kHz to minimize the inductance needed in the pick-up circuit. Conventional cable location equipment, which is also based on a signal coupled into the cable, uses a 22 kHz signal but this will be moved to 33 kHz to reduce radio frequency interference so the common mode signal could use a frequency in excess of 30 kHz.

The CAL value could be transmitted periodically, for example once a second. As small amounts of data, for example 10 bytes, would be required then the data rate of 80 bps would not be problematic. If more data were to be sent then spread spectrum techniques could be used to ensure that the common mode signal did not interfere with the voice or VDSL signals. Alternatively, the CAL value might be transmitted until the cabinet can detect that it has been received by the amplifier and used to configure the amplifier. This could be inferred by the OSS detecting that the signals received at the customer premises are such that the amplifier is working correctly, that is the signals are of an appropriate magnitude. Alternatively, if the OSS can determine that the customer premises equipment is operating at an appropriate data rate then it can also be inferred that the amplifier is working correctly.

The present disclosure provides a method of configuring a network element, for example an amplifier in a VDSL network. Configuration is transmitted to the amplifier using a common mode voltage signal so that there is no interference with the telephony or DSL signals.

The invention claimed is:

1. A method of operating a communications network, the method comprising:
    inserting, at a first location, a common mode voltage signal onto an electrical conductor used to transmit data using a differential signal, the common mode voltage signal carrying data comprising one or more operational parameters which determine the gain of an amplifier;
    receiving the common mode voltage signal from the electrical conductor at a second location; and
    operating an amplifier located at the second location in accordance with the one or more operational parameters.

2. A method according to claim 1, wherein the data carried using the common mode voltage signal further comprises data identifying one or more network elements.

3. A method according to claim 2, wherein the common mode voltage signal further comprises data identifying a cabinet in a FTTCab network or a cable in the FTTCab network.

4. A method according to claim 1, in which the common mode voltage signal is transmitted at a frequency in excess of 10 kHz.

5. A method according to claim 1, in which the common mode voltage signal is transmitted at a frequency in excess of 30 kHz.

6. A method according to claim 1, wherein the one or more operational parameters are transmitted periodically.

7. A method according to claim 1, wherein the common mode voltage signal is transmitted until it can be determined that the amplifier is being operated in accordance with the one or more operational parameters.

8. A method according to claim 7, wherein the operation of the amplifier can be determined in accordance with the data signals that are received at a customer premises which is connected to the communications network.

9. A communications network, the network comprising a fiber optic cable connection to a cabinet, a metallic cable connecting the cabinet to a customer premises and an amplifier connected to the metallic cable at a location intermediate the cabinet and the customer premises, the network being configured, in use, to:
    couple a common mode voltage signal onto the metallic cable at the cabinet, the common mode voltage signal carrying data comprising one or more operational parameters which determine the gain of an amplifier;
    receive the common mode voltage signal from the metallic cable at the amplifier; and
    operate the amplifier in accordance with the one or more operational parameters.

10. A communications network according to claim 9, wherein the amplifier comprises a VDSL amplifier.

11. An amplifier for use in a communications network, wherein the amplifier is connected to a cabinet via a metallic cable used to transmit data using a differential signal and, in use, is configured to:
    receive a common mode voltage signal from the metallic cable, the common mode voltage signal having been applied to the metallic cable at the cabinet and which comprises one or more operational parameters which determine the gain of an amplifier; and
    operate the amplifier in accordance with the received one or more operational parameters.

12. An amplifier according to claim 11, wherein the amplifier comprises a VDSL amplifier.

* * * * *